(12) United States Patent
Kondo et al.

(10) Patent No.: US 8,408,600 B2
(45) Date of Patent: Apr. 2, 2013

(54) TANK MOUNTING MECHANISM AND VEHICLE EQUIPPED WITH TANK

(75) Inventors: Keiichi Kondo, Chiryu (JP); Toshikazu Ito, Toyota (JP)

(73) Assignee: Toyota Jidosha Kabushiki Kaisha, Toyota-Shi (JP)

( * ) Notice: Subject to any disclaimer, the term of this patent is extended or adjusted under 35 U.S.C. 154(b) by 730 days.

(21) Appl. No.: 12/531,579

(22) PCT Filed: Feb. 5, 2009

(86) PCT No.: PCT/JP2009/052351
§ 371 (c)(1),
(2), (4) Date: Sep. 16, 2009

(87) PCT Pub. No.: WO2009/099249
PCT Pub. Date: Aug. 13, 2009

(65) Prior Publication Data
US 2010/0045018 A1   Feb. 25, 2010

(30) Foreign Application Priority Data
Feb. 7, 2008  (JP) ................................. 2008-027964

(51) Int. Cl.
*B60P 3/22* (2006.01)
(52) U.S. Cl. ....................................................... 280/834
(58) Field of Classification Search .................. 280/834; 224/538; 220/562, 581, 582; 206/305
See application file for complete search history.

(56) References Cited

U.S. PATENT DOCUMENTS

| | | | | |
|---|---|---|---|---|
| 1,198,885 A * | 9/1916 | Billinghurst | ........... | 280/124.163 |
| 2,915,799 A * | 12/1959 | Andreasen | ....................... | 24/270 |
| 3,313,372 A * | 4/1967 | Kilmer | ........................... | 181/114 |
| 4,025,080 A * | 5/1977 | Gedeon | ........................... | 280/834 |
| 4,319,728 A * | 3/1982 | Pataki et al. | ................... | 248/154 |
| 5,330,031 A * | 7/1994 | Hill et al. | ........................ | 180/271 |
| 5,845,940 A * | 12/1998 | Colburn | ........................... | 280/830 |
| 5,992,885 A * | 11/1999 | Fukagawa et al. | ............ | 280/830 |
| 7,137,474 B2 * | 11/2006 | Yokote | ........................... | 180/314 |

(Continued)

FOREIGN PATENT DOCUMENTS

| | | |
|---|---|---|
| JP | 04-136401 U | 12/1992 |
| JP | 07-041302 U | 7/1995 |

(Continued)

*Primary Examiner* — Tony H. Winner
*Assistant Examiner* — Daniel Yeagley
(74) *Attorney, Agent, or Firm* — Kenyon & Kenyon LLP (57) ABSTRACT

A tank mounting technique of the invention effectively responds to a variation in size of a high-pressure tank T in its longitudinal direction and allows positioning of the high-pressure tank T around its longitudinal axis. A tank receiving recess 110 provided below a vehicle platform F has a pair of a front inclined surface 112F and a rear inclined surface 112R arranged to face each other across a concave groove 114. A side face of the high pressure tank T is brought into contact with both the inclined surfaces 112F and 112R. An end face of a tank positioning groove TVS formed on the high pressure tank T is brought into contact with a contact structure 121 of a tank edge bracket 120. This arrangement enables the high-pressure tank T to be positioned in a vehicle vertical direction and a vehicle front-back direction, as well as in the tank longitudinal direction (in a vehicle width direction). The tank positioning groove TVS is aligned with a notch 122 formed in the tank edge bracket 120 to specify a rotational position of the high-pressure tank T around its longitudinal axis.

4 Claims, 6 Drawing Sheets

U.S. PATENT DOCUMENTS 7,249,786 B2 *   7/2007   Mascarenhas et al. ....... 280/830
7,270,209 B2 *   9/2007   Suess ........................... 180/69.5

FOREIGN PATENT DOCUMENTS

| | | | |
|---|---|---|---|
| JP | 09-220940 A | | 8/1997 |
| JP | 2000-219049 A | | 8/2000 |
| JP | 2001055050 A | * | 2/2001 |
| JP | 2001-113962 A | | 4/2001 |
| JP | 2001-225649 A | | 8/2001 |
| JP | 2001225650 A | * | 8/2001 |
| JP | 2001-239846 A | | 9/2001 |
| JP | 2002-340298 A | | 11/2002 |
| JP | 2003-118402 A | | 4/2003 |
| JP | 2004-257413 A | | 9/2004 |
| JP | 2005-170272 A | | 6/2005 |
| JP | 2005-238874 A | | 9/2005 |
| JP | 2008-024258 A | | 2/2008 |

* cited by examiner

Enlarged View Seen from X direction

TANK MOUNTING MECHANISM AND VEHICLE EQUIPPED WITH TANK

This is a 371 national phase application of PCT/JP2009/052351 filed 5 Feb. 2009, which claims priority of Japanese Patent Application No. 2008-27964 filed 7 Feb. 2008, the contents of which are incorporated herein by reference.

BACKGROUND

1. Technical Field

The present invention relates to a technique of mounting a long cylindrical tank on a vehicle.

2. Description of the Related Art

With recent advancement of fuel cells, fuel cell vehicles have been becoming popular. Hydrogen gas used as a fuel gas of the fuel cells is filled in a high-pressure gas tank, which is mounted on the fuel cell vehicle. Since weight reduction is highly demanded for the tank mounted on the vehicle, the high-pressure gas tank is generally made of a resin material. The high-pressure gas tank made of the resin material is expanded with an increase of the internal pressure of the tank in the gas filling process and is contracted with a decrease of the internal pressure of the tank in the gas consuming process. A tank mounting mechanism disclosed in JP-A 2003-118402 has been proposed by taking into account such characteristics.

The resin tank is expanded and contracted in its longitudinal direction as well as in its radial direction with a variation in internal pressure of the tank. The tank is required to be connected with gas piping after or simultaneously with mounting of the tank on the vehicle. Steel pipes having the high pressure resistance are generally used for such gas piping. It is thus required to position the tank around its longitudinal axis. The tank mounting mechanism disclosed in the above cited reference uses tank shoulders on tank edges to respond to expansion and contraction of the tank in the longitudinal direction. The tank shoulders are, however, naturally affected by the expansion and contraction of the tank. This prior art tank mounting mechanism accordingly has the relatively low reliability and requires further improvement.

SUMMARY

In order to solve the problem of the prior art discussed above, there would thus be a demand for effectively responding to a variation in size of a high-pressure tank in its longitudinal direction and allowing positioning of the high-pressure tank around its longitudinal axis.

The present invention accomplishes at least part of the demand mentioned above and the other relevant demands by variety of configurations and arrangements discussed below.

According to one aspect, the invention is directed to a tank mounting mechanism configured to mount a long cylindrical tank on a vehicle. The tank mounting mechanism comprises: a tank contact seat provided on a vehicle body to come into contact with a cylindrical side face of the tank at multiple different positions on an outer circumference of the tank transversely arranged; and a tank band structured to clamp the tank, which is in contact with the tank contact seat, against the tank contact seat.

The tank mounting mechanism according to this aspect of the invention brings the tank contact seat provided on the vehicle body into contact with the cylindrical side face of the tank at the multiple different positions on the outer circumference of the tank and thereby radially positions the tank transversely mounted on the vehicle. Since the tank contact seat is provided in advance on the vehicle body, bringing the transversely arranged tank in contact with the tank contact seat positions the tank in its radial direction, that is, both in a vertical direction and in a horizontal direction of the tank diameter. The tank transversely mounted and positioned in this manner is in contact with the tank contact seat and is clamped against the tank contact seat with the tank band. In one preferable embodiment of the tank mounting mechanism according to the above aspect of the invention, the tank contact seat has a pair of inclined surfaces that come into contact with the cylindrical side face of the tank at the multiple different positions on the outer circumference of the transversely arranged tank. The simple structure with the pair of inclined surfaces readily positions the tank in its radial direction.

In one preferable application of the tank mounting mechanism according to the above aspect of the invention, an end face of a tank edge member provided on at least one edge of the tank, which is transversely mounted and is positioned in the vertical direction and in the horizontal direction of the tank diameter, is brought into contact with a tank end face contact structure extended from the vehicle body to the tank. This arrangement positions the tank in the tank longitudinal direction. The tank end face contact structure has a rotational positioning member for specifying a rotational position of the tank in contact with the tank contact seat. Aligning the rotational positioning member with a specific mark for tank rotational positioning formed on the end face of the tank edge member specifies the rotational position of the tank or the position of the tank around the tank longitudinal axis. The tank transversely mounted and positioned in the above manner is in contact with the tank contact seat and is clamped against the tank contact seat with the tank band as mentioned previously. The tank mounting mechanism of this application effectively responds to a variation in size of the tank in its longitudinal direction accompanied with a variation in internal pressure of the tank and mounts the tank on the vehicle with positioning the tank both in the tank longitudinal direction and around the tank longitudinal axis. In one application, the tank edge member provided on at least one edge of the tank may be a flow path-forming member for a gas filled in the tank. The tank is then readily connectable with gas piping via the tank edge member.

In one preferable embodiment of the tank mounting mechanism of the above application, the rotational positioning member is a cut that is to be aligned with the specific mark formed on the end face of the tank edge member. The simple technique of making a cut and aligning the cut with the specific mark readily positions the tank around its longitudinal axis.

The technique of the invention is not restricted to the tank mounting mechanism configured to mount the long cylindrical tank on the vehicle as discussed above but is also actualized by a vehicle equipped with a long cylindrical tank.

According to another aspect, the invention is also directed to a vehicle equipped with a long cylindrical tank. The vehicle comprises: a vehicle body designed to have a tank contact seat that comes into contact with a cylindrical side face of the tank at multiple different positions on an outer circumference of the tank transversely arranged; and a tank band structured to clamp the tank, which is in contact with the tank contact seat, against the tank contact seat.

In the vehicle equipped with the tank according to this aspect of the invention, the tank is transversely mounted with positioning the tank in the vertical direction and in the horizontal direction of the tank diameter. An end face of a tank edge member provided on at least one edge of the tank, which is transversely mounted and is positioned in the vertical direction and in the horizontal direction of the tank diameter, is brought into contact with a tank end face contact structure extended from the vehicle body to the tank. This arrangement positions the tank in the tank longitudinal direction. Aligning a rotational positioning member provided on the tank end face contact structure with a specific mark specifies the rotational position of the tank or the position of the tank around the tank longitudinal axis. This arrangement enables the tank to be mounted on the vehicle with positioning the tank in the tank longitudinal direction and around the tank longitudinal axis, as well as in the tank radial direction. In one application, the tank edge member provided on at least one edge of the tank may be a flow path-forming member for a gas filled in the tank. The tank is then readily connectable with gas piping via the tank edge member.

The technique of the invention is not restricted to the tank mounting mechanism or the vehicle equipped with the tank as discussed above but is also actualized by a tank mounting method of mounting a long cylindrical tank on a vehicle.

According to still another aspect, the invention is further directed to a tank mounting method of mounting a long cylindrical tank on a vehicle. The tank mounting method brings the tank into contact with a tank contact seat, which is provided on a vehicle body to come into contact with a cylindrical side face of the tank at multiple different positions on an outer circumference of the tank transversely arranged. The tank mounting method then clamps the tank, which is in contact with the tank contact seat, against the tank contact seat.

The tank mounting method according to this aspect of the invention positions the tank both in the tank vertical direction and in the tank horizontal direction and transversely mounts the positioned tank on the vehicle. The tank mounting method then causes the end face of the tank edge member provided on at least one edge of the transversely arranged tank to come into contact with the tank end face contact structure and aligns the rotational positioning member provided on the tank end face contact structure with the specific mark for tank rotational positioning. This arrangement enables the tank to be mounted on the vehicle with positioning the tank both in the longitudinal direction and around the tank longitudinal axis.

DESCRIPTION OF THE PREFERRED EMBODIMENTS

Figure 1:
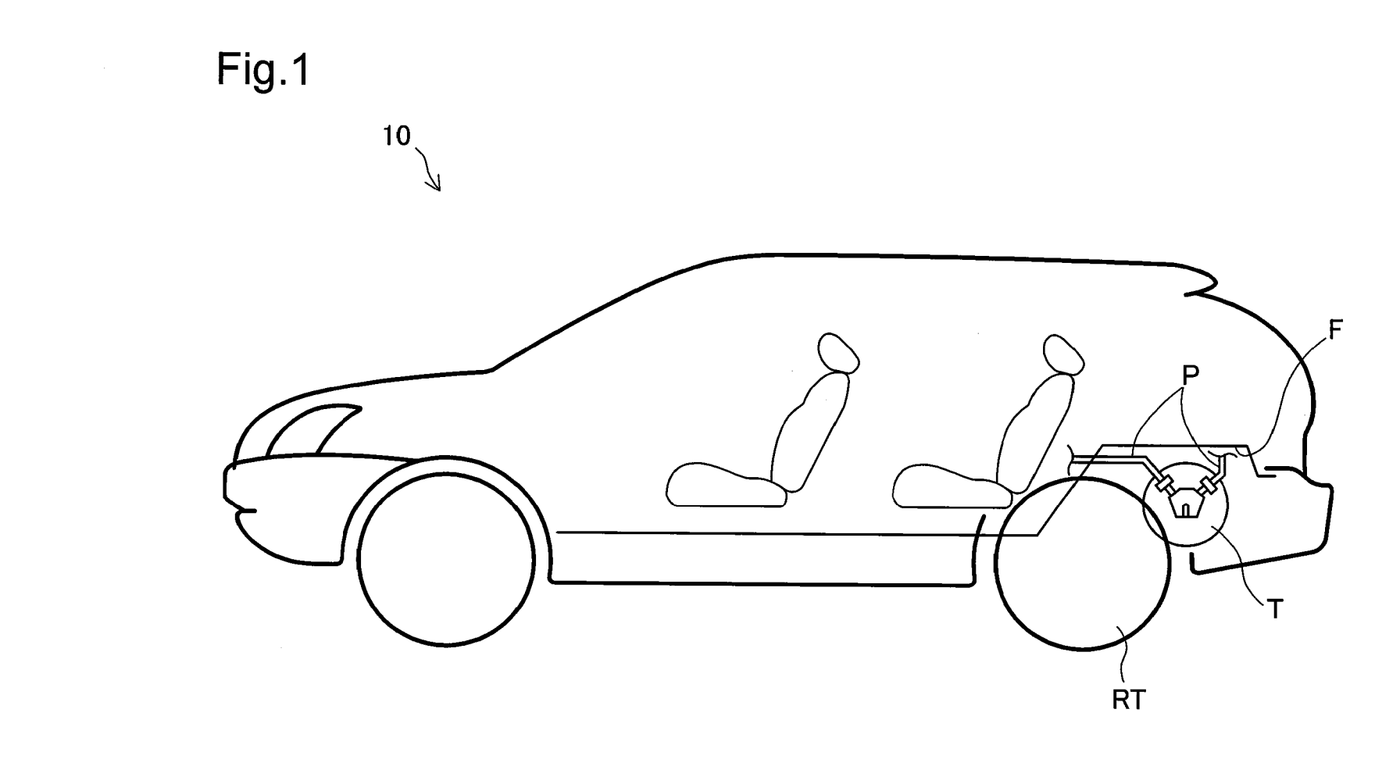
FIG. 1 is an explanatory view schematically showing a tank mounting appearance on a vehicle 10 in one embodiment of the invention.
Figure 2:
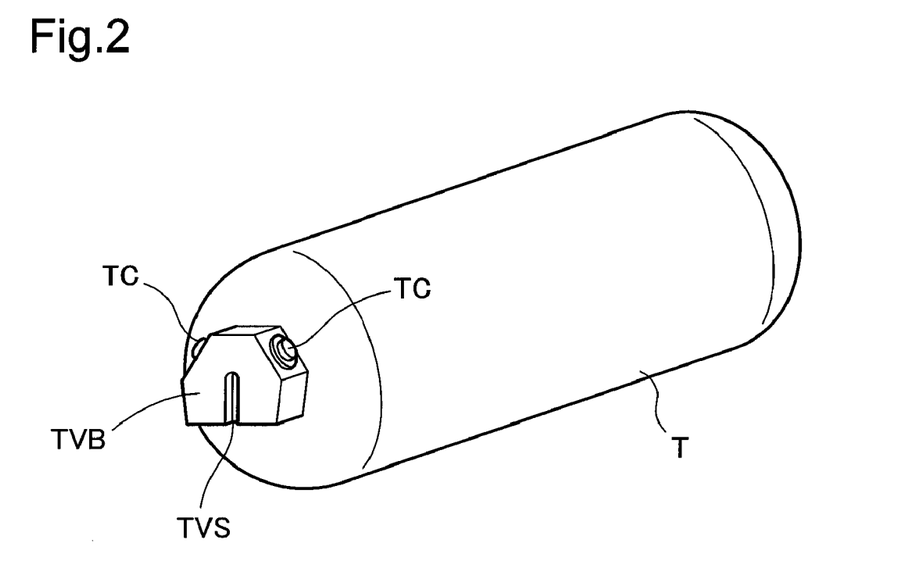
FIG. 2 is a schematic perspective view showing a high-pressure tank T that is mounted on the vehicle.
Figure 3:
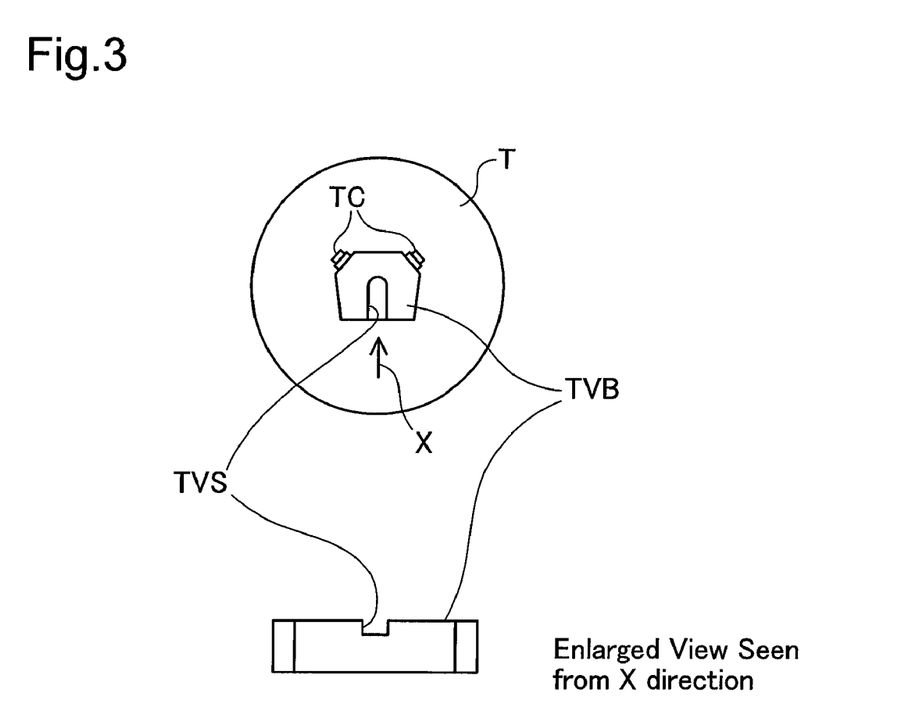
FIG. 3 is an end view of the high-pressure tank T and an enlarged explanatory view of the high-pressure tank T, seen from an X direction.

Some modes of carrying out the invention are described below with reference to the accompanied drawings. FIG. 1 is an explanatory view schematically showing a tank mounting appearance on a vehicle 10 in one embodiment of the invention. FIG. 2 is a schematic perspective view showing a high-pressure tank T that is mounted on the vehicle. FIG. 3 is an end view of the high-pressure tank T and an enlarged explanatory view of the high-pressure tank T, seen from an X direction.

As shown in FIG. 1, the high-pressure tank T is transversely mounted below a platform F in the vehicle 10 to make a longitudinal axis of the tank T in parallel with a vehicle width direction. The high-pressure tank T stores hydrogen gas at high pressure. The high-pressure hydrogen gas stored in the high-pressure tank T is supplied to fuel cells (not shown) mounted on the vehicle 10 via gas piping P. In the course of the gas supply, the high-pressure hydrogen gas is subjected to pressure reduction with a pressure reducing valve (not shown). The high-pressure tank T is transversely mounted along the vehicle width direction behind an axle of rear wheels RT. Another high-pressure tank T may be transversely mounted to be arranged in series with the illustrated high-pressure tank T along the vehicle width direction or may be transversely mounted to be arranged in parallel with and behind the illustrated high-pressure tank T along the vehicle width direction. The high-pressure tank T may otherwise be transversely mounted below the platform F on the front side of the vehicle.

The high-pressure tank T is made of a resin material and has a long cylindrical shape with a metal valve base TVB provided on its one edge as shown in FIG. 2. The valve base TVB is attached to one edge of the tank and has a flow path for the gas filled in the tank. The valve base TVB is connected with gas piping P via piping connectors TC mounted on its side faces. The valve base TVB is located at the substantial center on one edge of the tank and has a bottomed tank positioning groove TVS on its end face. The tank positioning groove TVS is cut from the tank center toward the tank outer circumference with an end mill or another suitable tool. The tank positioning groove TVS is formed at a suitable position determined relative to the positions of the piping connectors TC. The tank positioning groove TVS accordingly works as a specific mark for rotational positioning of the high-pressure tank T on the vehicle to locate the piping connectors TC at desired positions. The procedure of tank rotational positioning with the tank positioning groove TVS will be discussed later in detail.

Figure 4:
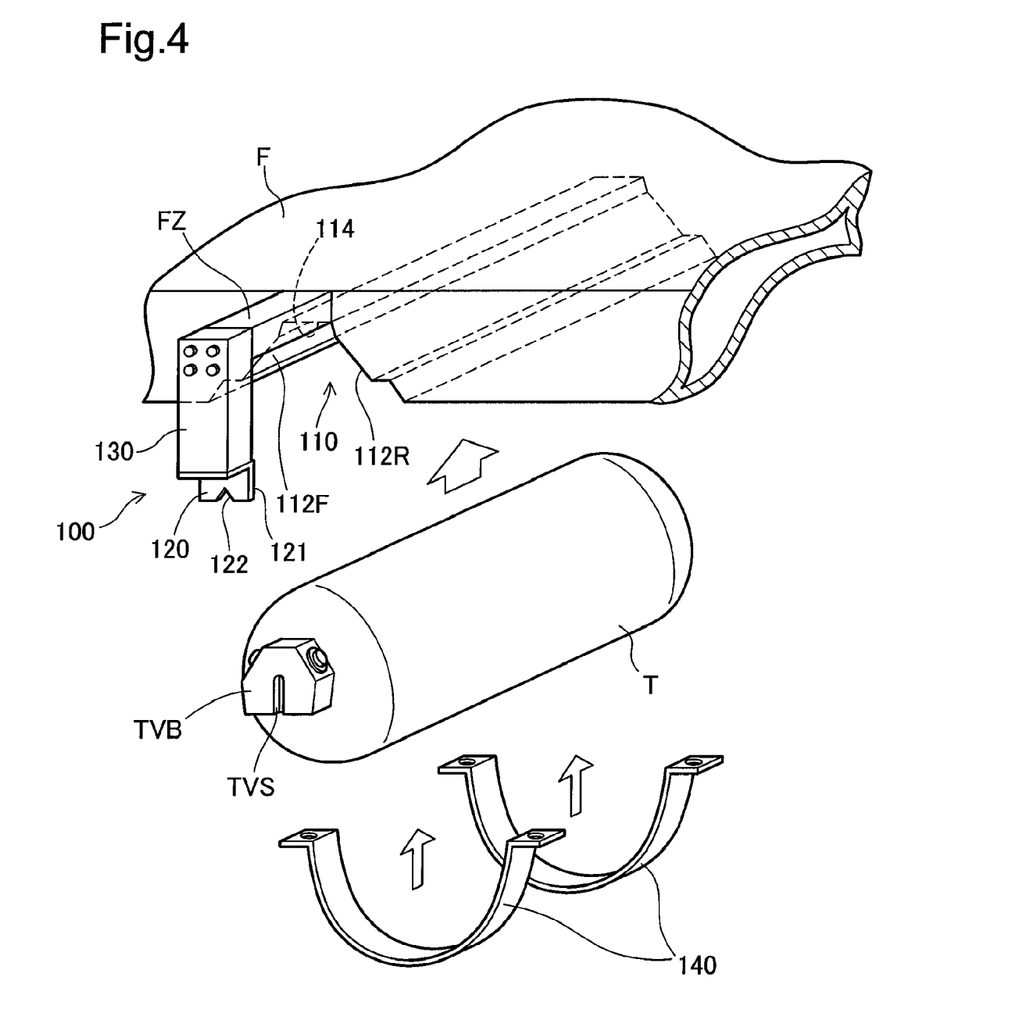
FIG. 4 is an explanatory view showing a mechanism for mounting the high-pressure tank T on the vehicle.
Figure 5:
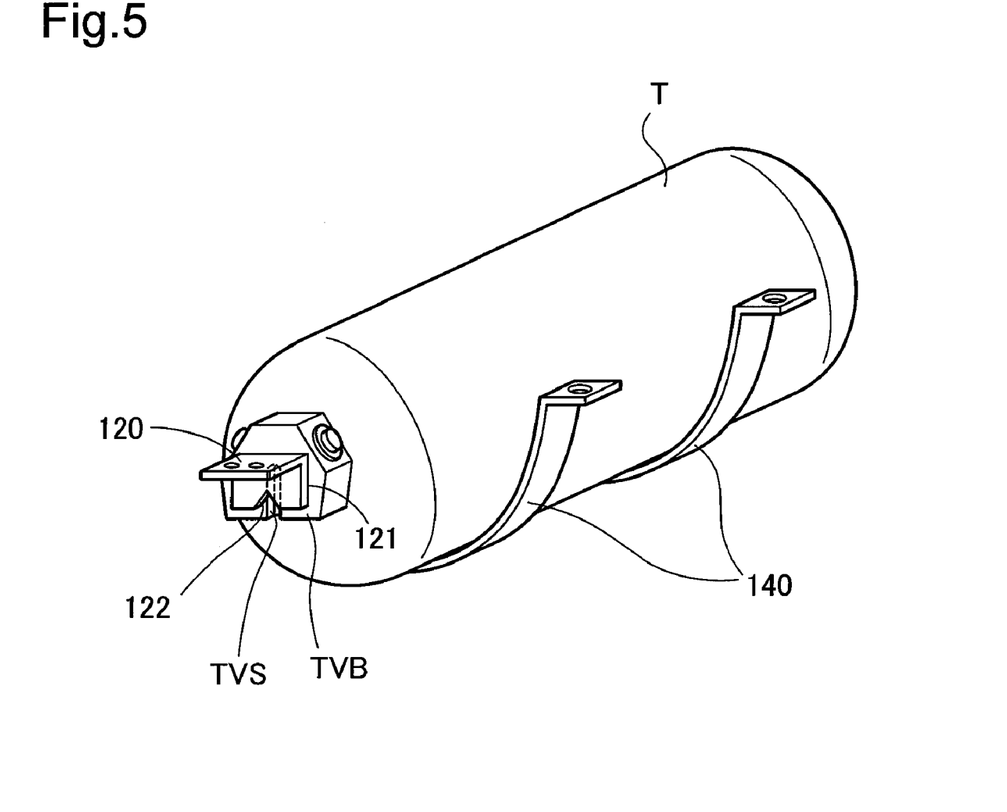
FIG. 5 is an explanatory view showing the high-pressure tank T with a tank edge bracket 120.
Figure 6:
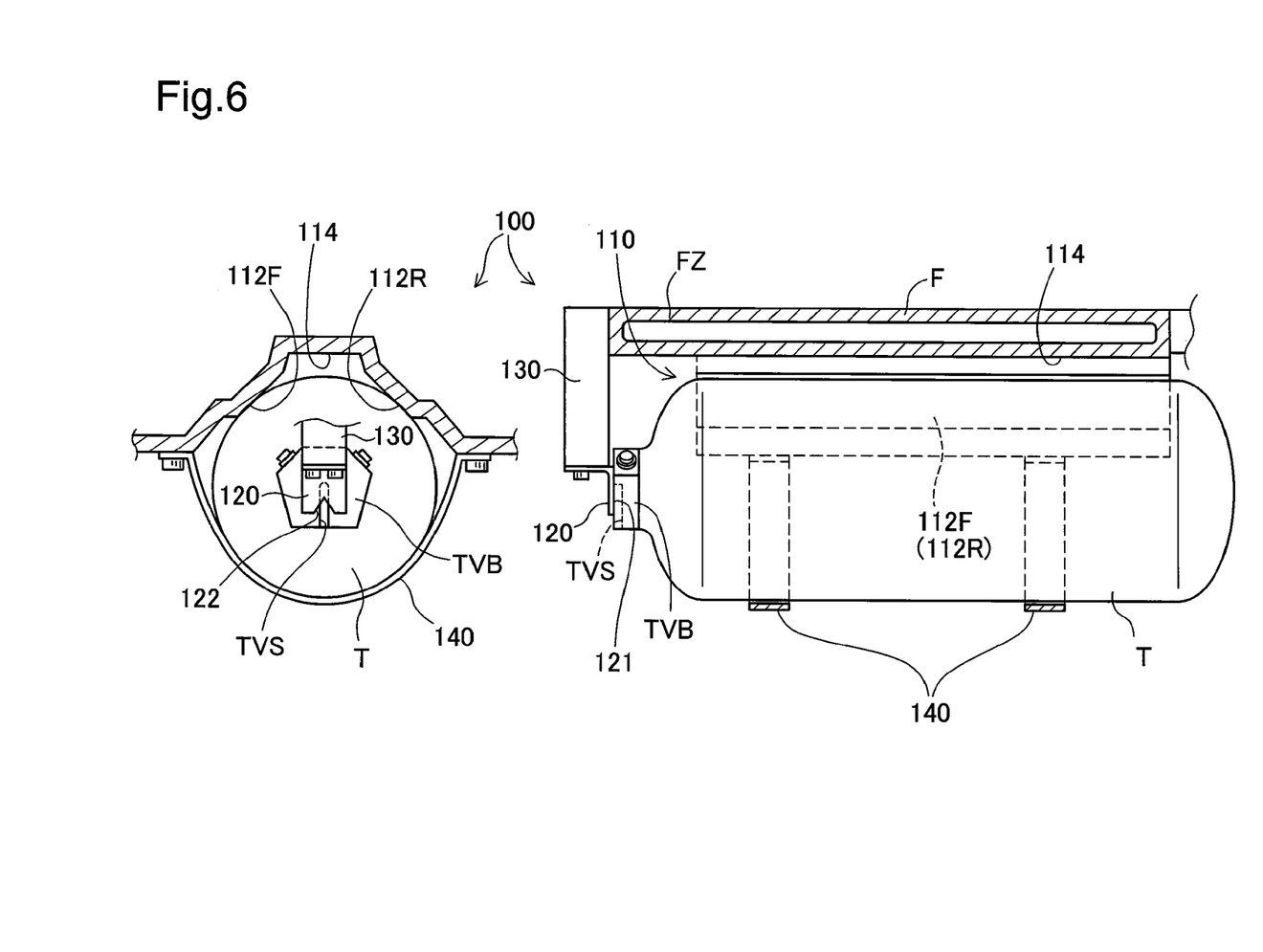
FIG. 6 is an end view and a longitudinal side view schematically showing a procedure of mounting the high-pressure tank T on the vehicle.

The tank mounting mechanism and the tank mounting procedure of mounting the high-pressure tank T on the vehicle are described below. FIG. 4 is an explanatory view showing a mechanism for mounting the high-pressure tank T on the vehicle. FIG. 5 is an explanatory view showing the high-pressure tank T with a tank edge bracket 120. FIG. 6 is an end view and a longitudinal side view schematically showing a procedure of mounting the high-pressure tank T on the vehicle.

As illustrated, a tank mounting mechanism 100 is incorporated in the platform F on the rear side of the rear wheels RT. The tank mounting mechanism 100 includes a tank receiving recess 110 that is formed in a concave shape in a lower face of the platform F to be extended in the vehicle width direction, a tank edge bracket 120 located on one edge of the tank receiving recess 110, and tank bands 140 for clamping the high-pressure tank T. The tank receiving recess 110 has a front inclined surface 112F and a rear inclined surface 112R that are extended in the vehicle width direction and are positioned in the vehicle front-back direction to face each other. A concave recess 114 extended in the vehicle width direction is formed between the two inclined surfaces 112F and 112R. The two inclined surfaces 112F and 112R arranged to face each other across the concave recess 114 are brought into contact with a cylindrical side face of the high-pressure tank T at two different positions on the outer circumference of the high-pressure tank T. Bringing the high-pressure tank T in contact with the front inclined surface 112F and the rear inclined surface 112R enables the transversely arranged high-pressure tank T to be supported by the two inclined surfaces 112F and 112R and accordingly positions the high-pressure tank T in its radial direction. The two inclined surfaces 112F and 112R are located above the high-pressure tank T mounted on the vehicle. The high-pressure tank T in contact with the two inclined surfaces 112F and 112R is accordingly positioned in the vertical direction and in the horizontal direction (in the vehicle vertical direction and in the vehicle front-back direction).

The tank edge bracket 120 located on one edge of the tank receiving recess 110 is fastened with bolts via a bracket support frame 130 to a frame attachment seat FZ extended in the vehicle width direction from the platform F. The tank edge bracket 120 is formed in an L shape as illustrated and has one side of the L shape fastened to a lower edge of the bracket support frame 130 and the other side of the L shape extended from the platform F toward the high-pressure tank T set in the tank receiving recess 110. The other side of the L-shaped tank edge bracket 120 accordingly forms a contact structure 121 that is in contact with an end face of the valve base TVB provided on the edge of the high-pressure tank T as shown in FIG. 5. The tank edge bracket 120 has a V-shaped notch 122 formed in the contact structure 121. The tank edge bracket 120 is fastened to the platform F via the bracket support frame 130, so that the notch 122 is located at the center of the front inclined surface 112F and the rear inclined surface 112R of the tank receiving recess 110.

The tank bands 140 are made of steel and are fastened to the platform F with bolts on both ends thereof. The tank bands 140 clamp the high-pressure tank T, which is in contact with the front inclined surface 112F and the rear inclined surface 112R of the tank receiving recess 110, against the front inclined surface 112F and the rear inclined surface 112R.

The tank mounting mechanism 100 of the structure discussed above is used to mount the high-pressure tank T on the vehicle. At least respective one ends of the tank bands 140 are detached from the platform F. The transversely arranged high-pressure tank T is lifted up into the tank receiving recess 110 with a tank lifter (not shown). The high-pressure tank T is lifted up to come into contact with the front inclined surface 112F and the rear inclined surface 112R of the tank receiving recess 110. After or simultaneously with bringing the high-pressure tank T in contact with the two inclined surfaces 112F and 112R, the high-pressure tank T is slid in the tank longitudinal direction toward the tank edge bracket 120 to bring an end face of the tank positioning groove TVS of the high-pressure tank T into contact with the contact structure 121 of the tank edge bracket 120. In this state, the high-pressure tank T comes into contact with the two inclined surfaces 112F and 112R of the tank receiving recess 110 to be positioned both in the vehicle vertical direction and in the vehicle front-rear direction, while coming into contact with the contact structure 121 of the tank edge bracket 120 to be positioned in the tank longitudinal direction (in the vehicle width direction).

The procedure then performs rotational positioning of the high-pressure tank T around the tank longitudinal. After positioning the high-pressure tank T in the vehicle vertical direction, in the vehicle front-rear direction, and in the vehicle width direction, the procedure visually checks the alignment of the notch 122 formed in the tank edge bracket 120 with the tank positioning groove TVS from the side of the tank edge bracket 120. As discussed previously, the tank positioning groove TVS is formed to be extended from the tank center toward the tank outer circumference. The notch 122 of the tank edge bracket 120 is located at the center of the front inclined surface 112F and the rear inclined surface 112R of the tank receiving recess 110. In the case of alignment of the trough of the notch 122 with the tank positioning groove TVS, the tank positioning groove TVS is extended in a predetermined direction or more specifically in the vertical direction. This accomplishes the rotational positioning of the high-pressure tank T around its longitudinal axis. In the case of misalignment of the trough of the notch 122 from the tank positioning groove TVS, on the other hand, the high-pressure tank T is rotated around its longitudinal axis to make the tank positioning groove TVS aligned with the trough of the notch 122. This accomplishes the rotational positioning of the high-pressure tank T around its longitudinal axis. After rotational positioning of the high-pressure tank T around its longitudinal axis, the procedure fastens the tank bands 140 to the platform F. This completes mountation of the high-pressure tank T on the vehicle.

As described above, the tank mounting mechanism 100 of the embodiment positions the transversely arranged high-pressure tank T in the vehicle vertical direction, in the vehicle front-rear direction, and in the vehicle width direction as well as around the tank longitudinal axis by means of the tank receiving recess 110 and the tank edge bracket 120 and clamps and fastens the positioned high-pressure tank T with the tank bands 140 to be mounted on the vehicle 10. Positioning the transversely arranged high-pressure tank T in the vehicle vertical direction and in the vehicle front-rear direction by means of the tank receiving recess 110, positioning the transversely arranged high-pressure tank T in the vehicle width direction by means of the tank edge bracket 120, and rotational positioning the transversely arranged high-pressure tank T around the tank longitudinal axis by alignment of the notch 122 of the tank edge bracket 120 with the tank positioning groove TVS can be performed even in the case of a variation in outer diameter of the tank T or a variation in size of the tank T in its longitudinal direction accompanied with a variation in internal pressure of the tank T. The tank mounting mechanism 100 of the embodiment effectively responds to even a variation in outer diameter of the tank T and a variation in size of the tank T in its longitudinal direction with a variation in internal pressure of the tank T and positions the high-pressure tank T to be mounted on the vehicle 10. The high-pressure tank T is thus readily connectable with the gas piping P via the piping connectors TC of the valve base TVB provided on one edge of the high-pressure tank T.

The tank mounting mechanism 100 of the embodiment readily mounts the high-pressure tank T on the vehicle by simply bringing the front inclined surface 112F and the rear inclined surface R facing each other across the concave groove 114 in contact with the two different positions on the outer circumference of the high-pressure tank T.

The high-pressure tank T is rotated to align the tank positioning groove TVS with the notch 122 formed in the tank edge bracket 120. This arrangement readily specifies the rotational position of the high-pressure tank T around its longitudinal axis.

Figure 7:
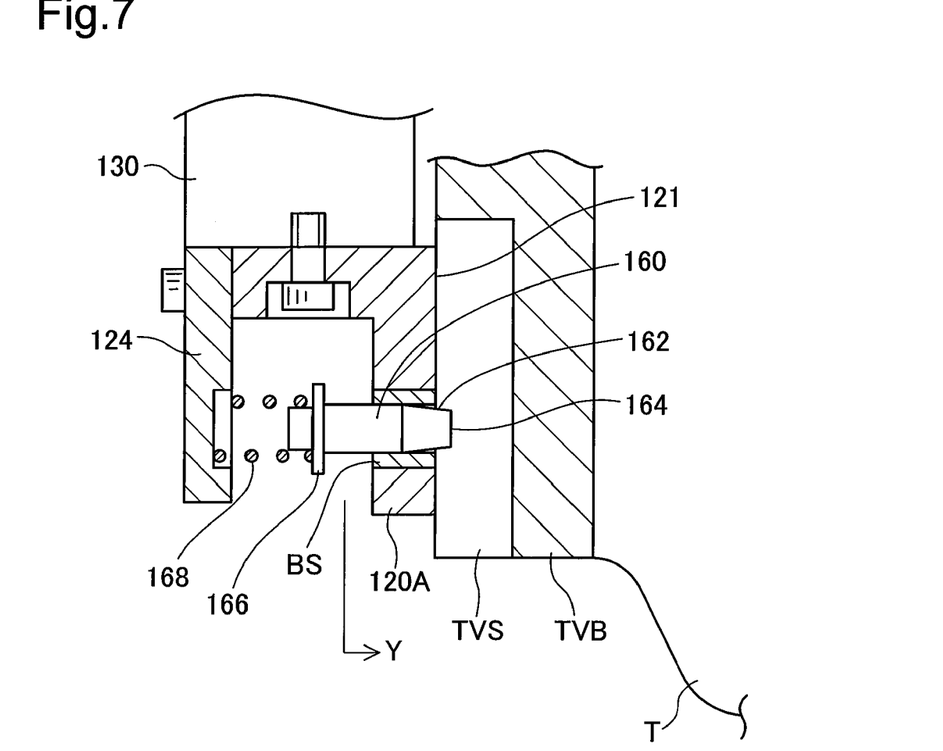
FIG. 7 is an explanatory view showing a tank edge bracket 120A included in a tank mounting mechanism 100 of one modified example with a valve base TVB provided on one end of the high-pressure tank T.
Figure 8:
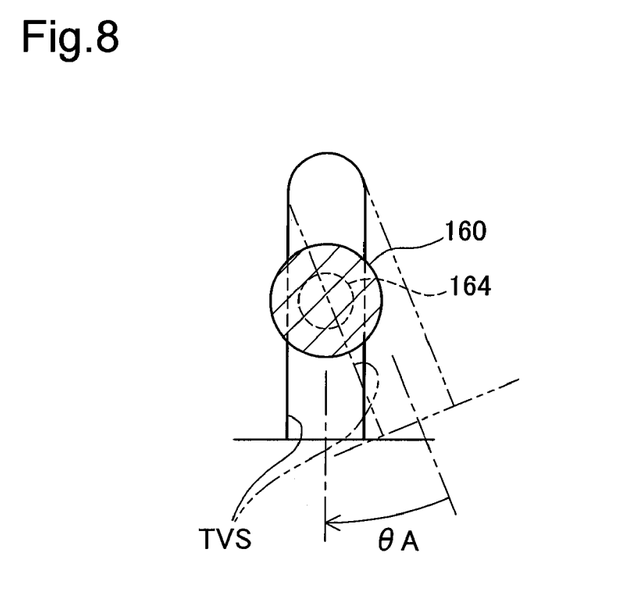
FIG. 8 is an explanatory view showing a process of rotational positioning the high-pressure tank around a tank longitudinal axis, seen from a Y direction in FIG. 7.

One modified structure of the tank mounting mechanism 100 is discussed below. FIG. 7 is an explanatory view showing a tank edge bracket 120A included in a tank mounting mechanism 100 of one modified example with a valve base TVB provided on one end of the high-pressure tank T. FIG. 8 is an explanatory view showing a process of rotational positioning the high-pressure tank around a tank longitudinal axis, seen from a Y direction in FIG. 7.

As illustrated, in the tank edge bracket 120A of the modified example, a pin 160 guided and slid by a bush BS is provided on a contact structure 121 fastened to a bracket support frame 130. The pin 160 has a tapered diameter element 162 on one edge and is pressed by a spring 168 located between a jaw 166 and a backboard 124. The pressing force makes the tapered diameter element 162 and an end face 164 of the pin 160 protruded from the contact structure 121 toward the valve base TVB. Like the notch 122 of the above embodiment, the pin 160 is located at the center of the front inclined surface 112F and the rear inclined surface 112R of the tank receiving recess 110. Rotational positioning of the high-pressure tank T around the tank longitudinal axis is performed by the tank edge bracket 120A as discussed below.

The tapered diameter element 162 of the pin 160 is protruded toward the valve base TVB as shown in FIG. 7. Alignment of the end face 164 of the pin 160 with the tank positioning groove TVS thus inserts the end face 164 of the pin 160 into the tank positioning groove TVS and makes the tapered diameter element 162 of the pin 160 engage with an edge of the tank positioning groove TVS. This state is equivalent to the alignment of the notch 122 with the tank positioning groove TVS in the structure of the embodiment as shown in FIG. 8. This accomplishes the rotational positioning of the high-pressure tank T around its longitudinal axis.

The end face of the valve base TVB is brought into contact with the contact structure 121 of the tank edge bracket 120A, while the high-pressure tank T is in contact with the front inclined surface 112F and the rear inclined surface 112R of the tank receiving recess 110. In the case of misalignment of the end face 164 of the pin 160 from the tank positioning groove TVS as shown by the two-dot chain line in FIG. 8, the high-pressure tank T is rotated in a direction of θA of FIG. 8. Under application of the pressing force of the jaw 166, such rotation inserts the end face 164 of the pin 160 into the tank positioning groove TVS and makes the tapered diameter element 162 of the pin 160 engage with the edge of the tank positioning groove TVS. The tank mounting mechanism 100 including the tank edge bracket 120A of the modified example accomplishes rotational positioning of the high-pressure tank T with the pin 160 by simply rotating the high-pressure tank T that is in contact with the front inclined surface 112F and the rear inclined surface 112R of the tank receiving recess 110 and bringing the end face of the valve base TVB in contact with contact structure 121 of the tank edge bracket 120A. The insertion of the end face 164 of the pin 160 into the tank positioning groove TVS and the engagement of the tapered diameter element 162 of the pin 160 with the edge of the tank positioning groove TVS give a favorable click feeling of the rotational operation of the high-pressure tank T. Such click feeling given by the tank edge bracket 120A facilitates the rotational positioning of the high-pressure tank T around the tank longitudinal axis.

The embodiment and its modified example discussed above are to be considered in all aspects as illustrative and not restrictive. There may be many other modifications, changes, and alterations without departing from the scope or spirit of the main characteristics of the present invention. For example, the notch 122 formed in the tank edge bracket 120 to be visually aligned with the tank positioning groove TVS may be replaced with a slit or a cut of any other suitable shape. The tank positioning groove TVS may be a mark-off line. The tank edge bracket 120A of the modified example may have a straight pin, instead of the tapered pin 160. In the structure of the embodiment discussed above, the tank receiving recess 110 is formed to face downward, and the high-pressure tank T is set upward to come into contact with the tank receiving recess 110. In one modification, the high-pressure tank T may be set downward or sideways to come into contact with the tank receiving recess 110 formed to face upward or wideways.

What is claimed is:

1. A tank mounting mechanism configured to mount a long cylindrical tank on a vehicle, the tank mounting mechanism comprising:
    a tank contact seat that is a recess provided on a vehicle body to receive a cylindrical side face of the tank transversely arranged;
    a tank band structured to clamp the tank, which is received in the recess of the tank contact seat, against the recess;
    a tank end face contact structure configured to come into contact with an end face of a tank edge member provided on at least one edge of the tank; and
    a rotational positioning member provided on the tank end face contact structure to be aligned with a specific mark for tank rotational positioning formed on the end face of the tank edge member and thereby specifying a rotational position of the tank in contact with inclined surfaces facing each other of the tank contact seat,
    wherein the rotational positioning member has a shaft that is movable back and forth from the tank end face contact structure on the side of the tank received in the recess, and allows an end of the shaft to fit in a groove as the specific mark formed on the end face of the tank edge member.

2. The tank mounting mechanism in accordance with claim 1, wherein the shaft is guided by a bush to move back and forth from the tank end face contact structure, has a tapered diameter element, and is pressed against the tank received in the tank contact seat under application of the pressing force of a jaw, and
    the tank received in the tank contact seat is axially rotated in such a way that the tapered diameter element of the shaft is aligned with the groove as the specific mark to fit in the groove, thereby allowing the tapered diameter element to engage with an edge of the groove and specifying the rotational position of the tank.

3. The tank mounting mechanism in accordance with either claim 1 or claim 2, wherein the tank contact seat has a pair of inclined surfaces facing each other across the bottom of the recess, and allows the inclined surfaces facing each other to come in contact with the cylindrical side face of the tank at a different position on a periphery of the tank.

4. The tank mounting mechanism in accordance with any one of claims 1, wherein the tank end face contact structure is extended from the vehicle body to the tank in contact with the inclined surfaces facing each other of the tank contact seat.

* * * * *